(12) United States Patent
Ohta et al.

(10) Patent No.: US 10,711,784 B2
(45) Date of Patent: Jul. 14, 2020

(54) AIR COMPRESSOR WITH DRAIN PIPE ARRANGEMENT

(71) Applicant: Hitachi Industrial Equipment Systems Co., Ltd., Chiyoda-ku, Tokyo (JP)

(72) Inventors: Hiroshi Ohta, Tokyo (JP); Hideki Fujimoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 240 days.

(21) Appl. No.: 14/764,332

(22) PCT Filed: Dec. 13, 2013

(86) PCT No.: PCT/JP2013/083415
§ 371 (c)(1),
(2) Date: Jul. 29, 2015

(87) PCT Pub. No.: WO2014/119144
PCT Pub. Date: Aug. 7, 2014

(65) Prior Publication Data
US 2015/0361984 A1  Dec. 17, 2015

(30) Foreign Application Priority Data
Jan. 30, 2013 (JP) .................................. 2013-014985

(51) Int. Cl.
*F04C 29/00* (2006.01)
*F04B 39/06* (2006.01)
(Continued)

(52) U.S. Cl.
CPC .......... *F04C 29/0092* (2013.01); *F04B 39/06* (2013.01); *F04B 39/16* (2013.01);
(Continued)

(58) Field of Classification Search
CPC ....... F16T 1/00; F16T 1/38; F16T 1/48; F16T 1/12; Y10T 137/3105; F04B 23/02;
(Continued)

(56) References Cited

U.S. PATENT DOCUMENTS 6,068,447 A * 5/2000 Foege ..................... F04B 23/02
417/12
6,679,689 B2 * 1/2004 Takahashi ............... F04C 23/00
417/243

(Continued)

FOREIGN PATENT DOCUMENTS

JP    60-187788 A    9/1985
JP    3-56305 U     5/1991
(Continued)

OTHER PUBLICATIONS

English Translation of JP2009133451A dated Jun. 18, 2009.*
(Continued)

*Primary Examiner* — Nathan C Zollinger
(74) *Attorney, Agent, or Firm* — Crowell & Moring LLP

(57) ABSTRACT

Provided is an air compressor which exhibits improved reliability by resolving problems relating to drainage discharge defects, and exhibits improved energy efficiency. The air compressor comprises: a compressor body which compresses air; a compressed air flow path through which the compressed air from the compressor body flows; a heat exchanger which is provided to the compressor flow path so as to cool the compressed air from the compressor body; and a drainage pipe (62) which branches from the compressed air flow path so as to connect to the exterior, and through which drainage condensed from the compressed air cooled in the heat exchanger flows. A strainer (65) which removes foreign matter contaminating the drainage is provided to the drainage pipe (62). An on-off valve (66) at the downstream side of the strainer (65), and a pressure sensor (41) at the
(Continued)

upstream side thereof, said sensor detecting pressure inside the drainage pipe (62), are each provided so as to resolve drainage discharge defects.

6 Claims, 2 Drawing Sheets

(51) Int. Cl.
|  |  |
| --- | --- |
| *F04B 39/16* | (2006.01) |
| *F04B 49/06* | (2006.01) |
| *F04B 49/10* | (2006.01) |
| *F04C 28/24* | (2006.01) |
| *F04C 29/04* | (2006.01) |
| *F16T 1/12* | (2006.01) |
| *F04C 23/00* | (2006.01) |
| *F04C 18/16* | (2006.01) |

(52) U.S. Cl.
CPC ............. *F04B 49/06* (2013.01); *F04B 49/10* (2013.01); *F04C 28/24* (2013.01); *F16T 1/12* (2013.01); *F04C 18/16* (2013.01); *F04C 23/001* (2013.01); *F04C 29/04* (2013.01); *F04C 2210/221* (2013.01)

(58) Field of Classification Search
CPC .......... F04B 25/00; F04B 39/16; F04B 41/02; F04B 49/10; F04B 49/06; F04B 39/06; F04C 29/0092; F04C 2210/221; F04C 28/24; F04C 29/04; F04C 23/001
See application file for complete search history.

(56) References Cited

U.S. PATENT DOCUMENTS

| | | | | |
|---|---|---|---|---|
| 8,075,668 | B2 * | 12/2011 | Delmotte | F04B 25/00 417/228 |
| 8,961,147 | B2 * | 2/2015 | Van Campfort | F16T 1/00 417/243 |
| 2002/0001531 | A1 * | 1/2002 | Takahashi | F04C 23/00 418/9 |
| 2008/0166253 | A1 * | 7/2008 | Fujimoto | F04C 18/16 418/201.1 |
| 2008/0279708 | A1 * | 11/2008 | Heimonen | F04C 29/0014 418/84 |
| 2011/0063345 | A1 * | 3/2011 | Cerro | B41J 2/175 347/7 |

FOREIGN PATENT DOCUMENTS

| | | | |
|---|---|---|---|
| JP | 2003-97444 | A | 4/2003 |
| JP | 2007-231740 | A | 9/2007 |
| JP | 2009-133451 | A | 6/2009 |
| JP | 2009133451 | A * | 6/2009 |
| JP | 2011-526338 | A | 10/2011 |
| JP | 2011-230095 | A | 11/2011 |
| JP | 2012-167675 | A | 9/2012 |
| JP | 5025381 | B2 | 9/2012 |
| WO | WO 2010/000045 | A1 | 1/2010 |

OTHER PUBLICATIONS

International Search Report (PCT/ISA/210) dated Apr. 8, 2014 with English-language translation (three (3) pages).
Japanese-language Office Action issued in counterpart Japanese Application No. 2013-014985 dated Jun. 7, 2016 with English translation (Fifteen (15) pages).

* cited by examiner

AIR COMPRESSOR WITH DRAIN PIPE ARRANGEMENT

TECHNICAL FIELD

The present invention relates to an air compressor.

BACKGROUND ART

As an air compressor which has a mechanism of discharging a drain generated after compressing and cooling air, there is one described in Patent Literature 1. This publication describes that "pressure detecting means (first pressure detecting means) 52 for detecting a pressure in a drain discharge circuit 40 at this position is provided between a strainer 42 and a diaphragm 41" in the drain circuit and "when the pressure in the fluid circuit between the diaphragm and the strainer falls to or below a reference pressure set to a predetermined pressure which is less than the pressure when the strainer is not clogged, it is determined that the strainer is clogged.

CITATION LIST

Patent Literature

PATENT LITERATURE 1: JP-A-2007-231740

SUMMARY OF INVENTION

Technical Problem

A drain-discharge-related structure and operation will be described by taking an oil-free screw compressor that compresses air in two stages as an example of air compressor. In the oil-free screw compressor that compresses air in two stages, the compressed air which is compressed to a predetermined pressure and heated to a high temperature by a low pressure stage side compressor body is temporarily subjected to intermediate cooling by an intermediate cooler before being sent under a pressure to a high pressure stage side compressor body, and therefore condensed water (drain) is generated here. Therefore, the drain needs to be removed by a drain separation apparatus such as a drain separator so that the drain is not mixed into the high pressure stage side compressor body. To remove the drain generated, according to Patent Literature 1, a branch circuit ("drain discharge circuit 40" in Patent Literature 1) is provided which has a mechanism for discharging the drain to the outside.

This branch circuit is provided with a strainer, a diaphragm (orifice) and a valve as a mechanism for discharging the drain to the outside. This branch circuit is configured so that one end thereof is open to the atmosphere and compressed air containing the drain is discharged to the outside. Here, pressure detection means such as a pressure sensor is provided between the strainer and the orifice to detect a pressure between the strainer and the orifice. Then, clogging of the strainer is determined in comparison with a certain reference pressure and a control signal is outputted.

However, the example in Patent Literature 1 is intended to detect clogging of the strainer, and when clogging of other parts such as orifice or pipe or defect in execution of work on an external pipe is detected, the pressure between the strainer and orifice does not decrease, and therefore there may be a situation in which it is not possible to detect errors. For this reason, reliability of the air compressor may deteriorate in association with defects or nonconformities of the drain discharge part in general.

Furthermore, although this branch circuit causes the circuit that supplies compressed air to communicate with the outside air, since the branch circuit is always slightly open, there is a problem that the compressed air always flows to the outside. In this case, the air compressor involves a problem with energy-saving properties.

The present invention has been implemented in view of the above-described problems and it is an object of the present invention to provide an air compressor capable of solving problems related to a so-called drain discharge defect, improving reliability and improving energy-saving properties.

Solution To Problem

In order to attain the above described object, an air compressor of the present invention is provided with a compressor body that compresses air, a compressed air flow path through which the compressed air from the compressor body flows, a heat exchanger provided on the compressed air flow path to cool the compressed air from the compressor body, a drain pipe which branches from the compressed air flow path to communicate with an outside and though which drain condensed from the compressed air cooled in the heat exchanger flows, a strainer provided in the drain pipe to remove foreign substances mixed in the drain, an on-off valve provided on a downstream side of the strainer in the drain pipe, and a pressure sensor provided on an upstream side of the strainer in the drain pipe to detect a pressure in the drain pipe.

Advantageous Effects of Invention

According to the present invention, it is possible to provide an air compressor that improves reliability and energy-saving properties.

DESCRIPTION OF EMBODIMENTS

Figure 1:
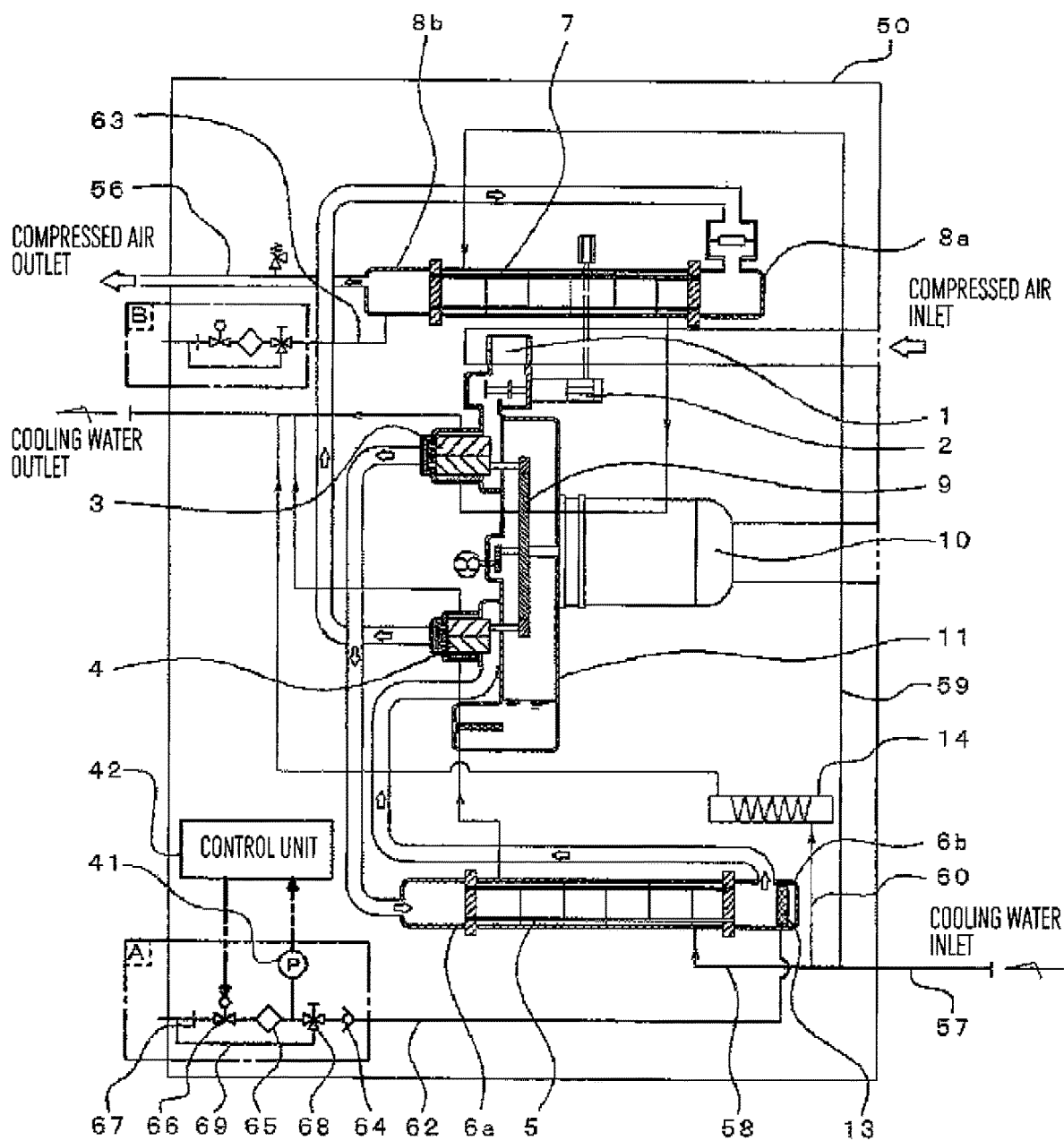
FIG. 1 is a system diagram of an air compressor.

Hereinafter, a specific embodiment of an air compressor of the present invention will be described with reference to the accompanying drawings. Note that in respective drawings, parts assigned identical reference numerals indicate identical or corresponding parts.

FIG. 1 is a system diagram indicating the air compressor according to the present embodiment. An example in FIG. 1 adopts a two-stage scheme using two screw-type compressors provided with a screw rotor in the compressor body and shows a water-cooling type two-stage oil-free screw compressor whose cooling system is a water cooling system.

The water cooling type two-stage oil-free screw compressor according to the present embodiment includes a first-stage low pressure stage side compressor body 3 and a second-stage high pressure stage side compressor body 4, and an intercooler 5 is provided between the low pressure stage side compressor body 3 and the second-stage high pressure stage side compressor body 4, and an aftercooler 7 is provided on the discharge side of the high pressure stage side compressor body 4, and these devices are connected via an air pipe making up a compressed air flow path. Furthermore, the intercooler 5 and the aftercooler 7 are constructed of a water-cooling type shell-and-tube type heat exchanger (shell-and-tube cooler). These components 3, 4, 5 and 7 and pipes connecting these components form a compressed air flow path.

Since the oil-free screw compressor according to the present embodiment does not contain any oil content in the compressed air, generation of a drain in the compressed air flow path is likely to cause rusting in the device in the compressor unit (screw compressor) and the compressed air flow path. Therefore, treatment of the drain is important in reliability of products.

In FIG. 1, reference numeral 50 denotes a case of a compressor unit (screw compressor) and the aforementioned first-stage low pressure stage side compressor body 3, second-stage high pressure stage side compressor body 4, intercooler 5, aftercooler 7 or the like are arranged in the case 50. The low pressure stage side compressor body 3 and the high pressure stage side compressor body 4 are driven by one main motor 10 via a gear 9. The compressor unit has a structure in which when the motor 10 is started and the compressor bodies 3 and 4 are driven, air flows along the compressor air flow path as shown by void arrows in the drawing.

That is, when the motor 10 is driven, outside air is guided to the inlet side of the low pressure stage side compressor body 3 via an intake pipe, and taken into the low pressure stage side compressor body 3 via a suction filter 1 and an intake throttle valve 2. The air taken into the low pressure stage side compressor body 3 is compressed and discharged by a pair of screw rotors, this compressed air (compressed gas) is guided from the first stage discharge pipe to an inlet header 6a of the intercooler 5, passes through a tube (heat transfer pipe) of the intercooler 5 and flows to an outlet header 6b side. When flowing through the tube, the compressed air is cooled by cooling water flowing outside the tube. The cooled compressed air passes through a second-stage intake pipe from the outlet header 6b and is taken into the high pressure stage side compressor body 4.

The low pressure stage side compressor body 3 boosts the pressure of the intake air to a predetermined intermediate pressure (e.g., on the order of 0.20 MPa) and the resultant high temperature (e.g., approximately 160° C.) compressed air is cooled in the intercooler 5 to, for example, "cooling water temperature+approximately 13 to 20° C." and taken into the high pressure stage side compressor body 4.

The air taken into the high pressure stage side compressor body 4 is pressure-boosted to a predetermined pressure (e.g., 0.70 MPa) and the resultant high temperature compressed air flows into an inlet header 8a of the aftercooler 7 via a discharge pipe, passes through a tube (heat transfer pipe) of the aftercooler 7 and flows to an outlet header 8b side. When passing through the tube, the compressed air flown into the aftercooler 7 is cooled by cooling water flowing outside the tube to, for example, "cooling water temperature+approximately 13° C." and is then supplied to the demanding side of the compressed air via the discharge pipe.

Note that a demister 13 is incorporated in the outlet header 6b of the intercooler 5 and the outlet header 6b has a structure that also functions as a drain separator. That is, when the compressed air is cooled in the intercooler 5, a drain is generated, but the drain generated is configured to be separated from the compressed air by the demister 13 and discharged out from the compressor unit 50 via a drain pipe 62.

The aftercooler 7 is also configured in substantially the same way as the intercooler 5 and a drain generated in the aftercooler 7 is configured to be discharged out from the compressor unit 50 via a drain pipe 63.

Another cooling system also exists. A water-cooling type oil cooler 14 is provided along a circulation path of a lubricant that flows isolated from the compressed air flow path for cooling the lubricant that lubricates bearing parts of the compressor bodies 3 and 4, and the gear 9. Although the circulation path of the lubricant is not shown in the diagram, there is a lubricant pipe that connects a gear box 11 that houses the gear 9 and the oil cooler 14.

Next, the cooling water pipe system through which cooling water flows will be described using FIG. 1. The cooling water enters the compressor unit 50 via a cooling water inlet pipe 57 and is divided into a first path that flows into the intercooler 5, a second path that flows into the aftercooler 7 and a third path that flows into the oil cooler 14.

The cooling water that flows along the first path flows into the intercooler 5 via a first cooling water pipe 58, cools the compressed air flowing through the tube of the intercooler 5, then passes through a cooling jacket provided in the second stage compressor body 4, cools the high pressure stage side compressor body 4 and is then discharged out from the compressor unit 50 from the cooling water outlet pipe.

The cooling water that flows along the second path flows into the aftercooler 7 via a second cooling water pipe 59, cools the compressed air flowing through the tube of the aftercooler 7, passes through a cooling jacket provided in the low pressure stage side compressor body 3, cools the low pressure stage side compressor body 3, and is then discharged out from the compressor unit 50 from the cooling water outlet pipe.

The cooling water that flows along the third path flows into the oil cooler 14 via a third cooling water pipe 60, cools the lubricant there and is then discharged out from the compressor unit 50 from the cooling water outlet pipe.

As already described, in the intercooler 5, the air pressure-boosted to an intermediate pressure (e.g., on the order of 0.20 MPa) and heated to a high temperature is cooled to, for example, the order of "cooling water temperature+13° C.", and therefore in most cases, the water content in the compressed air is condensed and a drain is generated. This drain flows into the outlet header 6b which also functions as a drain separator, separated from the compressed air by the demister 13, passes through the drain pipe 62 and is discharged out from the compressor unit 50.

Here, an intercooler 5 side drain discharge section (part A at bottom left in FIG. 1) will be described in more detail.

Figure 2:
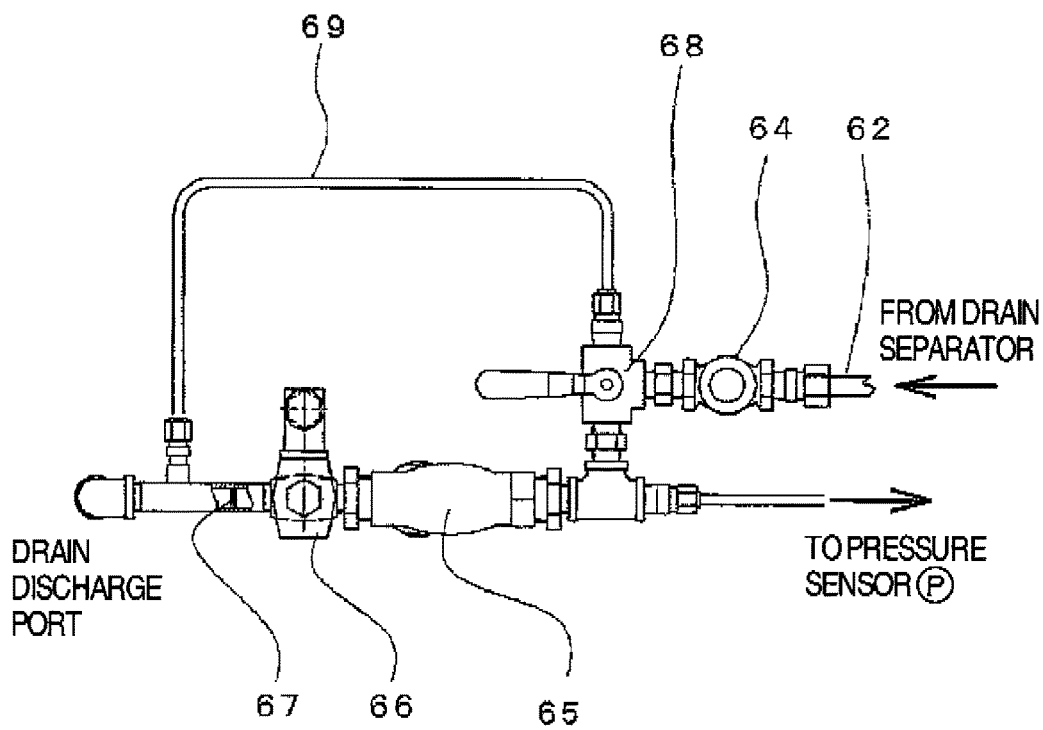
FIG. 2 is a diagram describing a detailed configuration of the drain discharge section shown in FIG. 1.

FIG. 2 is a diagram describing a detailed configuration of the part A shown in FIG. 1. The drain discharge section is constructed of a check valve 64, a Y-type strainer 65, an electromagnetic valve 66 and an orifice 67 connected to the drain pipe 62 in that order, and a drain discharge port at an end thereof is open to the atmosphere. Furthermore, a pressure sensor 41 is placed upstream of and immediately before the Y-type strainer 65 (that is, upstream of and immediately before an object to be checked for clogging).

Here, purposes of the respective components of the drain discharge section will be described.

The check valve 64 is placed for the purpose of preventing outside air from flowing into the compressed air flow path from the part A because the pipe of the low pressure stage compressor outlet has a negative pressure during an unload operation of the compressor, and therefore, the check valve 64 may be placed at any position of the drain discharge section.

The strainer 65 is intended to prevent foreign substances from being mixed into the electromagnetic valve 66 and the orifice 67 placed downstream. Therefore, the strainer 65 needs to be provided upstream of the electromagnetic valve 66 and the orifice 67.

The electromagnetic valve 66 is an on-off valve, on/off of which is controlled by a control unit 42 and is provided for the purpose of opening/closing the drain discharge section. Modes of the on-off control will be described later, and the electromagnetic valve 66 is provided downstream of the strainer 65 as described above. The orifice 67 is intended to adjust the amount of discharge of the compressed air with which the drain is mixed and is provided as required. When the amount of discharge need not be adjusted, the orifice 67 may be omitted.

In addition to these basic components, the present embodiment further provides a three-way switching valve 68 upstream of the strainer 65 and a bypass pipe 69 that branches from the three-way switching valve 68 to bypass the respective components 65 to 67. The three-way switching valve 68 is configured to be switched, when the strainer 65 is cleaned, so as to be enabled to change the flow direction to the bypass pipe 69 side.

When a drain discharge defect occurs in the above-described configuration, the drain generated in the intercooler 5 is taken into the high pressure stage side compressor body 4 together with the compressed air. The drain taken into the compressor body promotes rusting in the casing in the compressor body, increasing the possibility that the rotor may bite the rust, producing non-conformity such as fixed stagnation between the rotors or fixed stagnation between the rotor and the casing.

Causes for drain discharge defects may be assumed to be clogging of the strainer 65, operation defect of the electromagnetic valve 66, clogging of the orifice 67 and failure in normal discharge of the drain due to insufficient execution of work on the drain pipes or the like.

A drain also occurs in the aftercooler 7 in the same way as the intercooler 5. For this reason, a drain discharge section (part B at the top left in FIG. 1) is provided in the same way as the intercooler 5. However, since the pressure in this part never becomes negative during an unload operation for reasons related to the structure of the present embodiment, there is no need to provide a check valve such as the part A. When a drain discharge defect occurs, this may not directly affect the device in the compressor unit 50, but foreign substances may be mixed in the supply line toward the demanding side and may affect devices on the downstream side connected to a discharge pipe 56. Therefore, control similar to that of the on-off valve 66 in the part A is performed.

Figure 3:
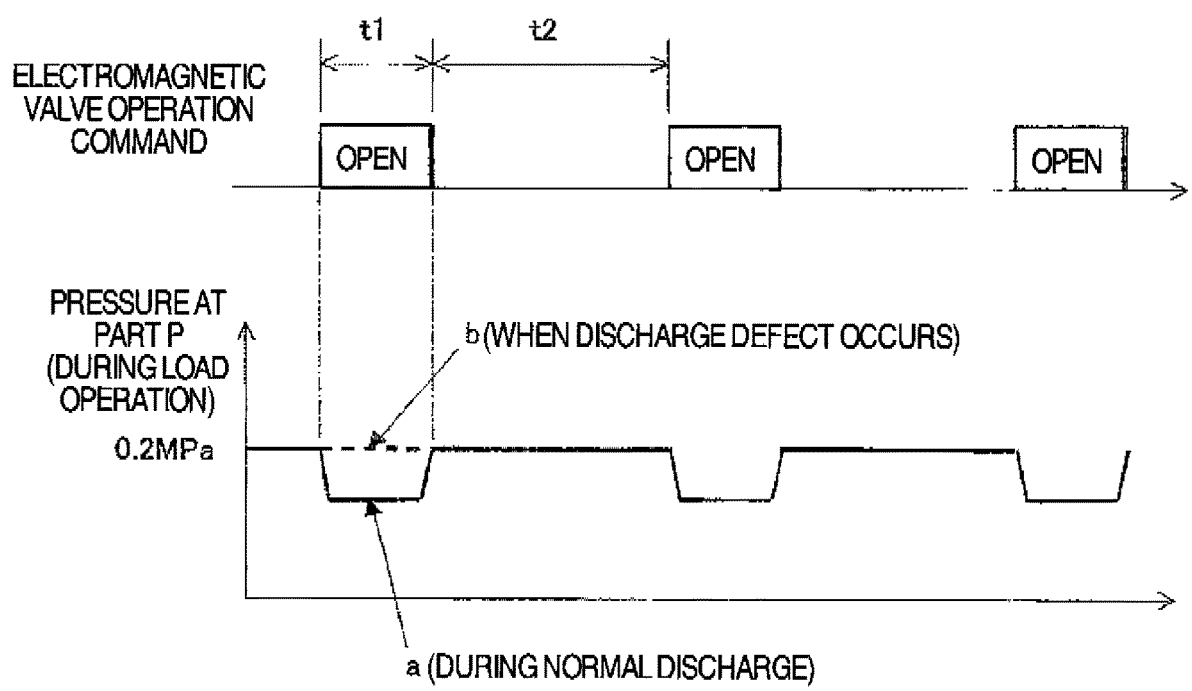
FIG. 3 is a diagram illustrating an electromagnetic valve operation command and a pressure.

Next, the on-off control of the electromagnetic valve 66 will be described. FIG. 3 is a diagram illustrating an operation command of the electromagnetic valve 66 and a pressure detected by the pressure sensor 41. Here, the drain discharge section (part A) of the intercooler 5 will be described as an example.

Although keeping drain discharge open all the time is a method generally used, keeping drain discharge open all the time means discarding compressed air to the exterior by an amount corresponding thereto, and it is therefore preferable to adopt intermittent discharge using an electromagnetic valve or the like from the standpoint of energy-saving. The present embodiment performs intermittent discharge by controlling on-off of the electromagnetic valve 66.

Through a signal from the control unit 42, the electromagnetic valve 66 is controlled so as to repeat ON/OFF; being opened for a time t1 (2 seconds, for example) and closed for a time t2 (30 seconds, for example). If no non-conformity such as clogging occurs and normal discharge is performed, the pressure in the pressure sensor 41 becomes like a (during normal discharge) shown by a solid line in FIG. 3.

However, if clogging occurs on any one of the components on the downstream side such as clogging of the strainer 65, the following problem occurs. That is, even when the electromagnetic valve 66 is opened, if the strainer 65 is closed, the electromagnetic valve 66 is not open to the atmosphere, and therefore the pressure detected in the pressure sensor 41 becomes like a broken line b (during discharge defect) with no variation. Therefore, if there is no pressure drop during output of an open signal to the electromagnetic valve 66, the system determines a discharge defect, and performs control such as displaying an alarm on a display section of the control unit of the compressor or determines a failure and causes the main motor 10 of the compressor to stop.

The principles of detection of a discharge defect due to clogging are as described above, but since a pressure change is small even during normal discharge, steps may be taken to prevent erroneous normal/defect decisions such as providing a certain time condition (defined time t3), outputting a plurality of open signals to the electromagnetic valve 66 within the time t3, comparing an open signal output count N1 with a pressure drop count N2, and determining as a discharge defect only when the pressure drop count N2 is equal to or less than a preset count N0 (smaller than N1). Note that during an unload operation, the pressure of the drain pipe (part A) on the intercooler 5 side becomes negative and no drain is generated, and therefore steps may be taken such as the intercooler 5 side making a determination only during a load operation.

Even when the electromagnetic valve 66 which is opened when power is on is used here, if the electromagnetic valve 66 does not operate due to a failure of the electromagnetic valve 66 or the like, it remains closed and there is no pressure change, which can thereby be determined as a discharge defect.

According to the present embodiment described so far, the following effects are obtained.

First, adopting the configuration without using the drain discharge section which is kept slightly open all the time can provide a configuration advantageous from the energy-saving standpoint.

In the configuration example described in BACKGROUND ART, even if an electromagnetic valve is provided in the diaphragm (orifice) to improve energy-saving properties, if the electromagnetic valve has an operation defect and remains closed, there is no means for determining the defect, whereas the present embodiment can solve this problem as well.

That is, by adopting the aforementioned configuration and control, it is possible not only to determine clogging of the strainer 65 but also to detect, in the event of a failure of the electromagnetic valve 66, defects in general such as clogging of the orifice 67, drain discharge defect caused by execution of piping by the customer, and can thereby contribute to improvement of product reliability.

When the pressure sensor 41 fails, it is also easy to detect the failure. That is, in the present embodiment, since the pressure sensor 41 is attached on the upstream side of the strainer 65, the pressure sensor 41 always detects the pressure of the compressed air (normally detects 0.2 MPa in the example shown in FIG. 3). Therefore, the sensor detects a pressure corresponding to the operating condition of the compressor during a normal operation, and can also easily determine the presence or absence of a failure of the pressure sensor 41.

Note that the present invention is not limited to the above-described embodiment, but includes various modifications. For example, the above-described embodiment has described the present invention in detail in an easy to understand way, and the embodiment is not necessarily limited to one provided with all the components described above. Some of the components of the embodiment may be replaced by other components or omitted, and other components may be added to the components of the embodiment.

For example, since the present invention needs only to be an air compressor requiring screw-type compressor drain discharge, a variety of embodiments can be assumed by changing the above described compression scheme to another, for example, changing the cooling scheme from a water cooling scheme to an air cooling scheme, changing the number of compression stages from a multi-stage scheme to a single stage scheme, changing an oil-free scheme to a refueling scheme or changing a screw scheme to a scroll scheme.

REFERENCE SIGNS LIST

3: low pressure stage side compressor body, 4: high pressure stage side compressor body, 5: intercooler, 6a: inlet header, 6b: outlet header, 7: aftercooler, 8a: inlet header, 8b: outlet header, 42: pressure sensor, 62: drain pipe, 64: check valve, 65: strainer, 66: electromagnetic valve, 67: orifice, 68: three-way switching valve, 69: bypass pipe

The invention claimed is:

1. An air compressor comprising:
   a compressor body that compresses air;
   a compressed air flow path through which the compressed air from the compressor body flows;
   a heat exchanger provided on the compressed air flow path to cool the compressed air from the compressor body;
   a drain separator which branches from the compressed air flow path and separates the compressed air and condensation cooled in the heat exchanger;
   a drain pipe which connects to the drain separator and though which the condensation flows;
   a strainer provided in the drain pipe to remove foreign substances mixed in the drain;
   an on-off valve provided on a downstream side of the strainer in the drain pipe, wherein
   the on-off valve is opened when power is turned on and closed when power is turned off,
   a pressure sensor provided on an upstream side of the strainer and downstream side of the drain separator in the drain pipe to detect a pressure in the drain pipe,
   a discharge defect is determined when a pressure detection value detected in the pressure sensor, while the on-off valve is open, does not become lower than a pressure detection value, while the on-off valve is closed, and
   control is performed such that a count of open signals outputted within a defined time is compared with a count of drops of pressure detection values detected by the pressure sensor, and the discharge defect is determined when the count of drops of pressure detection values is smaller than the count of outputted open signals.

2. The air compressor according to claim 1, wherein a screw rotor is provided in the compressor body.

3. The air compressor according to claim 1, wherein the air compressor is an oil-free scheme that includes no lubricant in the compressed air flow path.

4. The air compressor according to claim 1, wherein the heat exchanger is a water cooling scheme that performs heat exchange between cooling water and compressed air.

5. The air compressor according to claim 1, wherein the compressor body comprises two compressor bodies of a low pressure stage compressor body and a high pressure stage compressor body, and condensation from the compressed air cooled in the heat exchanger provided between the low pressure stage compressor body and the high pressure stage compressor body flows through the drain pipe.

6. The air compressor according to claim 5, wherein the heat exchanger is a water cooling scheme that performs heat exchange between cooling water and compressed air.

\* \* \* \* \*